No. 860,396. PATENTED JULY 16, 1907.
C. H. LINN.
AUTOMATIC DOUBLE FLUSHING SIPHON.
APPLICATION FILED MAR. 21, 1907.
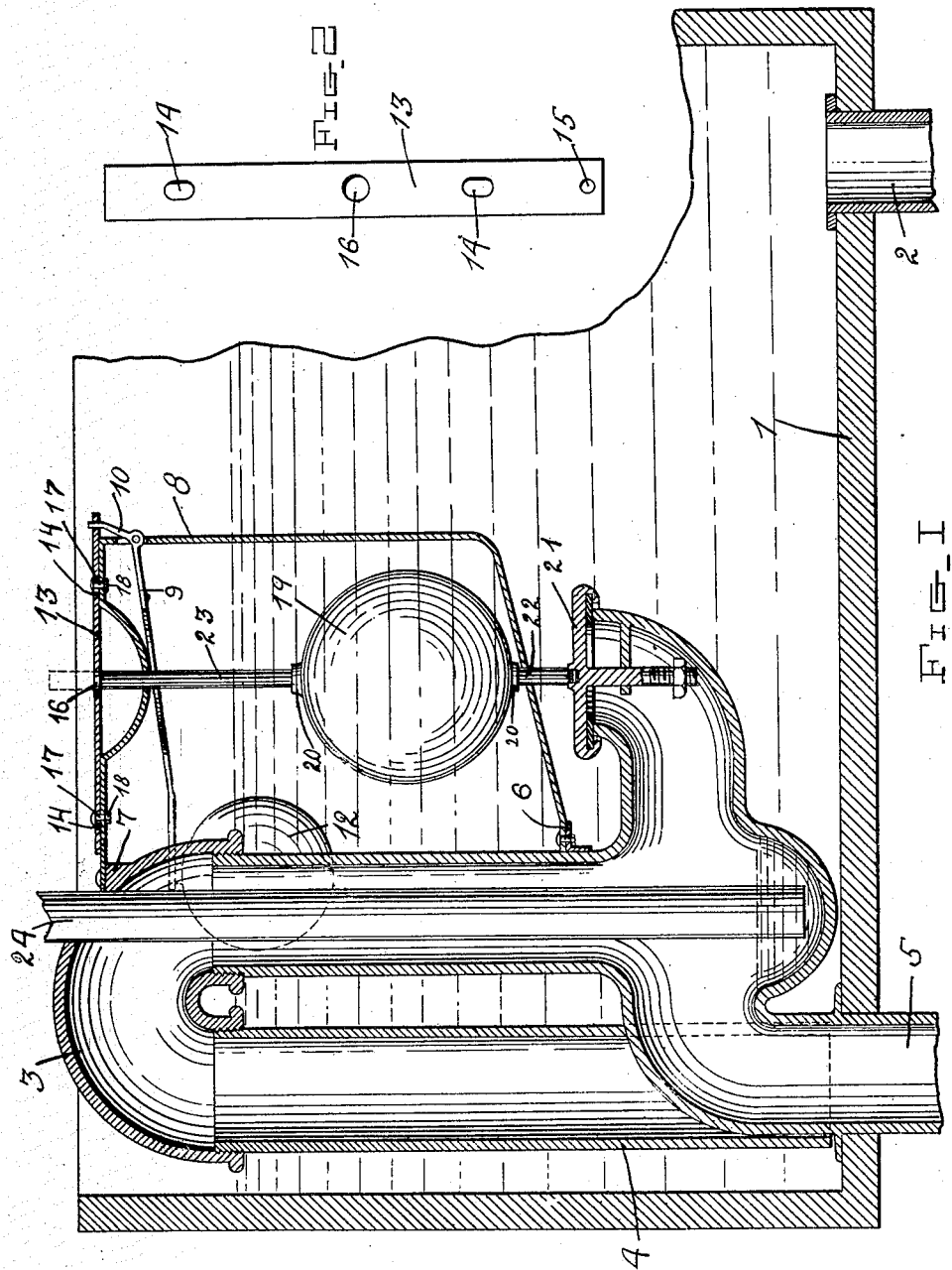
Inventor
CLYDE H. LINN
Witnesses

UNITED STATES PATENT OFFICE.

CLYDE H. LINN, OF NEW BRIGHTON, PENNSYLVANIA, ASSIGNOR OF ONE-HALF TO CHRIS. W. MALI, OF NEW BRIGHTON, PENNSYLVANIA.

AUTOMATIC DOUBLE-FLUSHING SIPHON.

No. 860,396.     Specification of Letters Patent.     Patented July 16, 1907.

Application filed March 21, 1907. Serial No. 363,642.

*To all whom it may concern:*

Be it known that I, CLYDE H. LINN, a citizen of the United States, residing at New Brighton, in the county of Beaver and State of Pennsylvania, have invented certain new and useful Improvements in Automatic Double-Flushing Siphons; and I do declare the following to be a full, clear, and exact description of the invention, such as will enable others skilled in the art to which it appertains to make and use the same.

My invention has relation to new and useful improvements in automatic double flushing siphons, for flushing range closets, urinals, or the like, and has for its object the production of a siphon of this character which is simple of construction, comparatively inexpensive of production and efficient in use.

With these and other objects in view, the invention consists in certain novel features of construction, combination and arrangement of parts, as will be more fully described and particularly pointed out in the appended claims.

In the accompanying drawing, Figure 1 is a vertical section of a water tank with my invention secured in operative position therein; Fig. 2 is a detail side elevation of a sliding bar used in connection with my invention.

Referring more particularly to the drawings, 1 represents a water tank, which is supplied with water from a pipe, 2, from which water continually flows into said tank. A siphon, 3, having an inlet end, 4, is connected at its opposite or outlet end to an outlet pipe, 5, secured to and extending vertically through the bottom of the water tank. Secured to the outer surface and near the outlet end of said siphon, 3, somewhat above the upper end of said outlet pipe, 5, is a horizontal shelf, or support, 6, and secured to the outer surface of said siphon in vertical alinement with said shelf or support, 6, and near the top of said water tank, 1, is a corresponidng horizontal shelf or support, 7.

8, represents an upright frame, which is securely bolted or otherwise secured at its ends to the upper faces of said shelves or supports, 6 and 7. An arm, 9, having an operating finger, 10, at or near its outer end, is pivoted at its inner end to or near the upper outer corner of said frame, 8. The opposite end of said arm is fixed in any suitable manner to a ball, 12, of suitable size.

13 represents a horizontal sliding bar, which is slidably mounted on the top of said frame, 8. Said bar is provided near each end with an elongated longitudinal slot or opening, 14, and near one of its outer ends, outward of the adjacent slot or opening 14, with a vertical opening, 15, and with a vertical preferably circular opening, 16, between said slots or openings 14. In the application of my invention, said sliding bar is slidably mounted on the top of said frame, 8, by bolts, 17, which pass through the slots or openings, 14, in said bar, through the top of said frame 8, and have nuts, 18, screwed on their lower ends to hold them in position. It will be obvious that making said slots or openings, 14, in said sliding bar elongated, makes said bar susceptible of a pre-determined horizontal movement on the top of said frame, the purpose of which will be disclosed. The said operating finger, 10, of said arm, 9, works through the vertical opening, 15, in said sliding bar.

A ball, 19, having two diametrically opposite interiorly threaded caps, 20, secured to its surface, works in said tank, 1, immediately below the top of said frame, 8. A suitable valve 21 which normally rests over the upper end of said outlet pipe, 5, is removably connected with said ball by a valve stem, 22, working through a corresponding guide opening in said frame, 8, and screwed at its upper end in one of the interiorly threaded caps, 20, of said ball. A vertical guide rod, 23, is screwed at its lower threaded end in one of said interiorly threaded caps, 20, of said ball and works through a corresponding guide opening in the top of said frame. The upper end of said guide rod normally works against the under face of said sliding bar.

24 represents an air pipe which is secured vertically in the outlet port of said siphon and has its lower end immersed in a pool of water in and near the outer end of said siphon.

The operation of my invention is as follows: The water flowing into said tank through the pipe, 2, causes said ball, 12, to rise in said tank and slide the sliding bar, 13, inwardly on the top of said frame, 8, until the said vertical opening 16 comes immediately over the upper end of said guide rod, 23, when the upper part of said rod passes through said opening, 16, and permits the ball, 19, to rise to the surface of the water and raise said valve, 21, from the upper end of said outlet pipe, 5, where it normally rests. As soon as the valve, 21, is raised off of the upper end of said outlet pipe the water flows out of said tank through said outlet pipe until the level of the water in the tank is such as to permit said valve, 21, to again cover up and rest on the upper end of said outlet pipe, 5, which upper end acts as a valve opening. The water in the tank flowing out of said outlet pipe, 5, and rushing past the outlet end of said siphon produces a suction therein and as soon as the valve, 21, covers the upper end of the outlet pipe, the siphon begins to act and sucks the water up through its inlet end to the outlet pipe, 5, until the water in the tank is below the level of the inlet end of said siphon.

From the foregoing description, taken in connection with the drawings, the construction and operation of my improved siphon will be readily understood without a more expanded explanation.

Various changes in the form, proportion and minor details of construction may be resorted to without departing from the principle or sacrificing any of the advantages of the invention.

Having described my invention, what I claim as new, and desire to secure by Letters-Patent, is:

1. In an automatic double flushing siphon, the combination of a water tank, a supply pipe communicating with said tank, a siphon pipe secured vertically in said tank, an outlet pipe communicating near its upper end with the discharge end of said siphon pipe, an upright frame secured to said siphon pipe, a ball working below the top of said tank, a valve, fitting over the upper end of said outlet pipe and connected with said ball, a vertical guide rod secured to said ball and working through the top of said frame, and a sliding bar having a vertical opening slidably mounted on the top of said frame, with means for sliding said sliding bar horizontally until said opening therein is immediately over the upper end of said guide rod, when the water reaches a pre-determined level in the tank, substantially as described.

2. In an automatic double flushing siphon, the combination of a water tank, a supply pipe communicating with said tank, an upright frame sustained in said tank, a sliding bar having a vertical opening slidably mounted on said frame, an arm pivoted to said frame and provided at its pivoted end with a finger engaging one end of said sliding bar, a float depending from the free end of said arm and a float movably sustained in said frame and having a guide rod adapted to pass upward through the opening in said sliding bar when moved a predetermined distance on said frame.

3. In an automatic double flushing siphon, the combination of a water tank, a supply pipe communicating with said tank, an upright frame sustained in the tank, a sliding bar having a vertical opening slidably mounted on said frame, means for effecting a predetermined movement of said bar when the water reaches a predetermined level in the tank, and a float movably sustained in the frame and having a guide rod adapted to pass through the opening in said bar when moved on the frame.

In testimony whereof I have hereunto set my hand in presence of two subscribing witnesses.

CLYDE H. LINN.

Witnesses:
FRANK K. KENNEDY,
F. X. FISHER.